March 13, 1956     A. C. INGVERTSEN     2,738,077
WIRE GIN
Filed Jan. 22, 1954
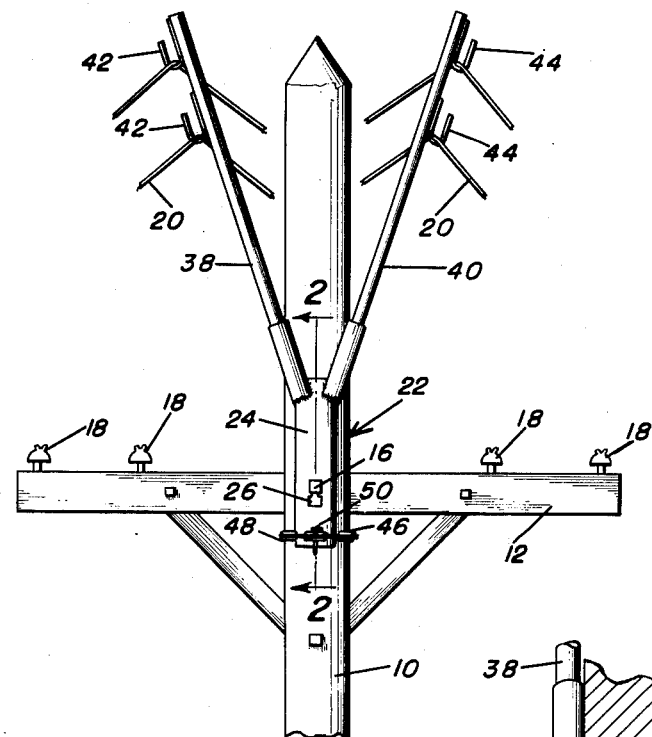
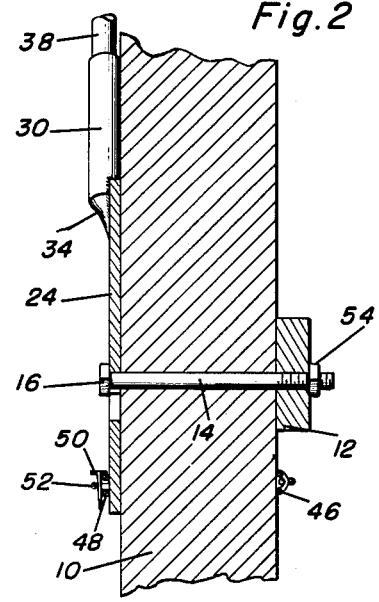
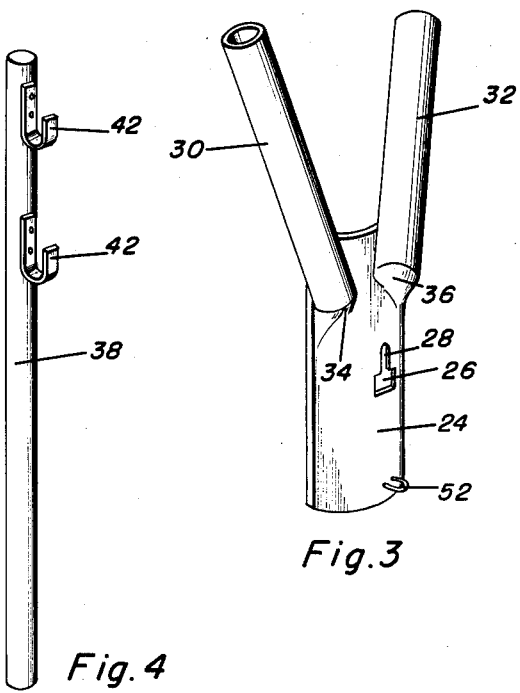
Arthur C. Ingvertsen
INVENTOR.

United States Patent Office 2,738,077
Patented Mar. 13, 1956

2,738,077

WIRE GIN

Arthur C. Ingvertsen, Unionville, Conn.

Application January 22, 1954, Serial No. 405,642

1 Claim. (Cl. 211—107)

This invention relates to a wire gin or auxiliary supporting structure for use primarily in supporting cables while repairing or replacing a cross-piece of a utility pole.

The primary object of this invention resides in the provision of means which is easily installed on a utility pole so that the cables carried by the cross-piece of the utility pole can be easily removed therefrom and supported by the invention until repairs can be completed or the cross-piece replaced.

A further object of this invention resides in the provision of means for supporting the cables of a utility pole in such position as to provide adequate head room for a workman engaged in repairing the utility pole and the parts thereof.

The construction of this invention especially features an arcuate plate having an enlarged aperture therethrough for reception of the head of the bolt utilized in attaching the cross-piece to the utility pole. The arcuate plate is provided with a slot therein opening into the aperture for reception of the shank of the bolt, and additional clamping means are provided for securely holding the plate to the pole. The plate has attached thereto tubular retainers which extend divergingly upwardly and outwardly to carry the sticks which support the cables.

Still further objects and features of this invention reside in the provision of a wire gin that is strong and durable, simple in construction and manufacture, especially easy to install, and which is comparatively light in weight, thereby enabling such device to be utilized by workmen repairing utility poles at comparatively great heights above the ground.

These, together with the various ancilliary objects and features of the invention which will become apparent as the following description proceeds, are attained by this wire gin, a preferred embodiment of which has been illustrated in the accompanying drawings, by way of example only, wherein:

Figure 1 is an elevational view illustrating the wire gin as installed on a utility pole;

Figure 2 is a vertical sectional view as taken along the plane of line 2—2 in Figure 1;

Figure 3 is a perspective view of the wire gin with the sticks removed therefrom; and Figure 4 is a perspective view of one of the sticks utilized in combination with the wire gin.

With continuing reference to the accompanying drawings wherein like reference numerals designate similar parts throughout the various views, reference numeral 10 generally designates a utility pole having a cross-arm 12 which is attached to the utility pole 10 by means of a bolt 14 having a head 16. The cross-arm 12 supports suitable insulators as at 18 which normally support the cables or wires 20 of the various utilities.

It is to be recognized that this invention can be used for single arm, rural or standard installations as well as double arm, outrigger, or light corner installations and the wire gin is generally designated by reference numeral 22. The wire gin includes an arcuate plate 24 whose inner surface conforms to the contours of a portion of the utility pole 10 and which is provided with an aperture 26 therethrough. A slot 28 opens into the aperture 26 and extends through the plate 24. Welded or otherwise attached to the plate 24 are a pair of tubular retainers 30 and 32 which have open upper ends and whose bottom ends are closed, as at 34 and 36, to form a seat for sticks 38 and 40. The sticks 38 and 40 have hooks 42 and 44, respectively, for supporting the wires or cables 20.

Welded or otherwise attached to the plate 24 are suitable clamping means 46. The clamping means 46 may include the chain members 48 together with a pin 50 which extends through links of the chain and an eyelet 52 welded or otherwise attached to the plate 24, or may be other suitable clamping means of such other construction as may be desired.

In use, the bolt 14 may be loosened by rotation of the nut 54 until the plate 24 can be slid over the head 16 of the bolt 14, the head 16 being received in the enlarged aperture 26. Then, the plate 24 can be lowered so that the shank of the bolt 14 seats within the slot 28. After the clamping means 46 have been secured, the sticks 38 and 40 can be emplaced in the tubular retainers 30 and 32 and then the wires or cables 20 can be emplaced over the hooks 42 and 44. After the wires 20 have been removed from the insulators 18, the nut 54 can be entirely removed, after which the cross-arm 12 can be taken off the bolt 14 and then replaced or repaired as may be desired. It is to be noted that the bolt 14 never need be entirely removed.

It is to be noted that the sticks 38 and 40 then support the wires or cables 20 above the head of the repairman thereby permitting him to readily and easily complete such repairs as are necessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A wire gin for use in supporting cables while repairing a cross-piece of a utility pole, comprising an arcuate plate adapted to conform with and overlie a part of the pole, said arcuate plate having an enlarged aperture therethrough for reception of the bolt normally holding the cross-piece to the pole, said arcuate plate having a slot therein opening into said aperture, said slot being adapted to receive the shank of the bolt, clamp means secured ot said arcuate plate for clampingly embracing the pole, and a pair of tubular retainers secured to the upper portion of said arcuate plate, the bottom ends of said tubular retainers being closed, said tubular retainers extending divergingly upwardly and outwardly, sticks received in said tubular retainers, and hooks secured to said sticks for supporting the wires normally carried by the cross-piece.

References Cited in the file of this patent

UNITED STATES PATENTS

| | | |
|---|---|---|
| 840,009 | Pierce | Jan. 1, 1907 |
| 1,230,992 | Brigham | June 26, 1917 |
| 1,262,776 | Gohl | Apr. 16, 1918 |
| 1,547,915 | Hirn | July 28, 1925 |
| 1,737,151 | Derbyshire | Nov. 26, 1929 |
| 2,607,398 | Andrews | Aug. 19, 1952 |